US005375172A

United States Patent [19]

Chrosny

[11] Patent Number: 5,375,172

[45] Date of Patent: Dec. 20, 1994

[54] POSTAGE PAYMENT SYSTEM EMPLOYING ENCRYPTION TECHNIQUES AND ACCOUNTING FOR POSTAGE PAYMENT AT A TIME SUBSEQUENT TO THE PRINTING OF POSTAGE

[76] Inventor: Wojciech M. Chrosny, 81 Linwood St., Milford, Conn. 06460

[21] Appl. No.: 882,871

[22] Filed: Jul. 7, 1986

[51] Int. Cl.$^5$ .......... G06F 15/20

[52] U.S. Cl. .......... 380/51; 380/23; 380/25; 364/464.02

[58] Field of Search .......... 364/200, 900, 478, 464.02; 235/462; 380/23, 25, 51

[56] References Cited

U.S. PATENT DOCUMENTS

| | | | |
|---|---|---|---|
| 3,938,095 | 2/1976 | Check, Jr. et al. | 364/900 |
| 3,978,457 | 8/1976 | Check, Jr. et al. | 364/200 |
| 4,241,994 | 12/1980 | Ryan, Jr. | 355/77 |
| 4,249,180 | 2/1981 | Eberle et al. | 375/2.1 |
| 4,253,158 | 2/1981 | McFiggans | 364/900 |
| 4,301,507 | 11/1981 | Soderberg et al. | 364/464 |
| 4,302,810 | 11/1981 | Bouricius et al. | 364/200 |
| 4,307,293 | 12/1981 | Lazzarotti et al. | 235/462 |
| 4,334,771 | 6/1982 | Ryan, Jr. | 355/133 |
| 4,376,299 | 3/1983 | Rivest | 364/900 |
| 4,421,977 | 12/1983 | Kittredge | 364/900 |
| 4,447,890 | 5/1984 | Duwel et al. | 364/900 |
| 4,458,109 | 7/1984 | Mueller-Schloer | 178/22.11 |
| 4,511,793 | 4/1985 | Racanelli | 235/375 |
| 4,578,759 | 3/1986 | Horii | 364/478 |
| 4,637,051 | 1/1987 | Clark | 382/1 |
| 4,641,346 | 2/1987 | Clark et al. | 380/3 |
| 4,641,347 | 2/1987 | Clark et al. | 380/3 |
| 4,649,266 | 3/1987 | Eckert | 235/432 |
| 4,660,221 | 4/1987 | Dlugos | 380/23 |
| 4,796,193 | 1/1989 | Pitchenik | 364/464.02 |

FOREIGN PATENT DOCUMENTS

| | | | |
|---|---|---|---|
| 0076972 | 4/1983 | European Pat. Off. | G06K 3/02 |
| 0154972 | 9/1985 | European Pat. Off. | G07D 7/00 |
| 2073661 | 10/1981 | United Kingdom | B42D 12/00 |

*Primary Examiner*—Bernarr E. Gregory

[57] ABSTRACT

The postage system employs encryption techniques to verify that a user has printed postage. The postage at the time of printing is not accounted for by the meter. Accounting occurs at a time subsequent to the printing of postage. The user is provided with a postage validating device which provides an indication on the mailpiece of the validity of the imprint to identify the user and a user account number. Charges for the postage thus printed occur at a subsequent time. The imprint is read, preferably by scanning techniques, to determine validity, amount to be charged and an account number which is charged for the delivery.

10 Claims, 3 Drawing Sheets

POSTAGE PAYMENT SYSTEM EMPLOYING ENCRYPTION TECHNIQUES AND ACCOUNTING FOR POSTAGE PAYMENT AT A TIME SUBSEQUENT TO THE PRINTING OF POSTAGE

FIELD OF THE INVENTION

The present invention relates to postage metering systems and more particularly, to a postage payment system employing encryption techniques and where the accounting for postage payment occurs at a time which is subsequent to the printing of the postage.

BACKGROUND OF THE INVENTION

Postage meters are mass produced devices for printing a defined unit value for governmental or private carrier delivery of parcel and envelopes. The term "postage meter" also includes other like devices which provide unit value printing such as tax stamp meters. Postage meters include internal accounting devices which account for postage value representation which is stored within the meter and is printed by the meter. As a result, postage meters must possess an extremely high reliability to avoid the loss of user or governmental funds stored within the meters.

Electronic postage meters have been developed with electronic accounting circuitry. Postage meter systems of this type are disclosed in U.S. Pat. No. 3,978,457 for "MICROCOMPUTERIZED ELECTRONIC POSTAGE METER SYSTEM" and U.S. Pat. No. 4,301,507 for "ELECTRONIC POSTAGE METER HAVING PLURAL COMPUTING SYSTEM". The electronic postage meters of this type include non-volatile memory capability for storing postage accounting information within the meter. The memory function in the meter electronic accounting circuits have replaced the function served in mechanical postage meters by mechanical accounting registers.

Electronic postage meter systems have also been proposed that employ encrypting techniques. Systems of this type are disclosed in U.S. patent application Ser. No. 724,372 filed Apr. 17, 1985, for George B. Edelmann and Arno Muller and entitled "SYSTEM FOR DETECTING UNACCOUNTED FOR PRINTING IN A VALUE PRINTING SYSTEM", now U.S. Pat. No. 4,757,537 an additional continuation in part application for Ser. No. 832,904 filed Feb. 25, 1986 for George B. Edelmann, Arno Muller, Alfred Schmidt and Kevin Hunter and now U.S. Pat. No. 4,775,246 also describes systems employing encryption techniques in printing postage. In these systems, the metering device at the user location includes a stored representation within the meter of the postage value available for printing. Printing is accomplished by a type of printing device which prints variable data, in this case both the postage value and encrypted information so that the validity of the imprint can be verified at a later date.

SUMMARY OF THE INVENTION

It has been discovered that a novel system for charging a user for postage used can be provided where a postage meter at the user location does not store value representing the postage available to be printed. The postage system of the present invention employs encryption techniques to verify that the user has imprinted postage. The postage, however, at the time of printing, is not accounted for by the meter. Accounting for postage payment occurs at a time subsequent to the printing of postage.

The user, at the user location, is provided with a postage validating device. When postage is printed, the postage validating device provides an indication on the mailpiece of the validity of the imprint. It identifies the user and also, if desired, a user account number. Charges for the postage printed by the user occur at a time subsequent to the printing of postage, that is, after the mailpiece has entered the stream of the postage delivery system. Such accounting is made, preferably by using scanning techniques such as optical character reading of imprinted bar codes or the like, when the mail is processed by the post office or other suitable organization. Further, in accordance with the invention, the imprint on the mailpiece is read to determine the validity of the imprint, the postage value amount and the user's account number. The user's account is then charged at the time the mailpiece is read.

A postage meter system employing the present technique includes a computer, a postage validating device coupled to the computer for providing postage validating information to be printed on a mailpiece, the validating information including a user'accounting number, a printer coupled to the computer, the computer being operative for driving the printers for printing the validating information on a mailpiece along with a postage value, the printing of postal value not being accounted for at the time of postage value printing.

A BRIEF DESCRIPTION OF THE DRAWINGS

A complete understanding of the present invention may be obtained from the following detailed description of the preferred embodiment thereof, when taken in conjunction with the accompanying drawings, wherein like reference numerals designate similar elements in the various figures, and in which.

DESCRIPTION OF THE PREFERRED EMBODIMENT

Figure 1:
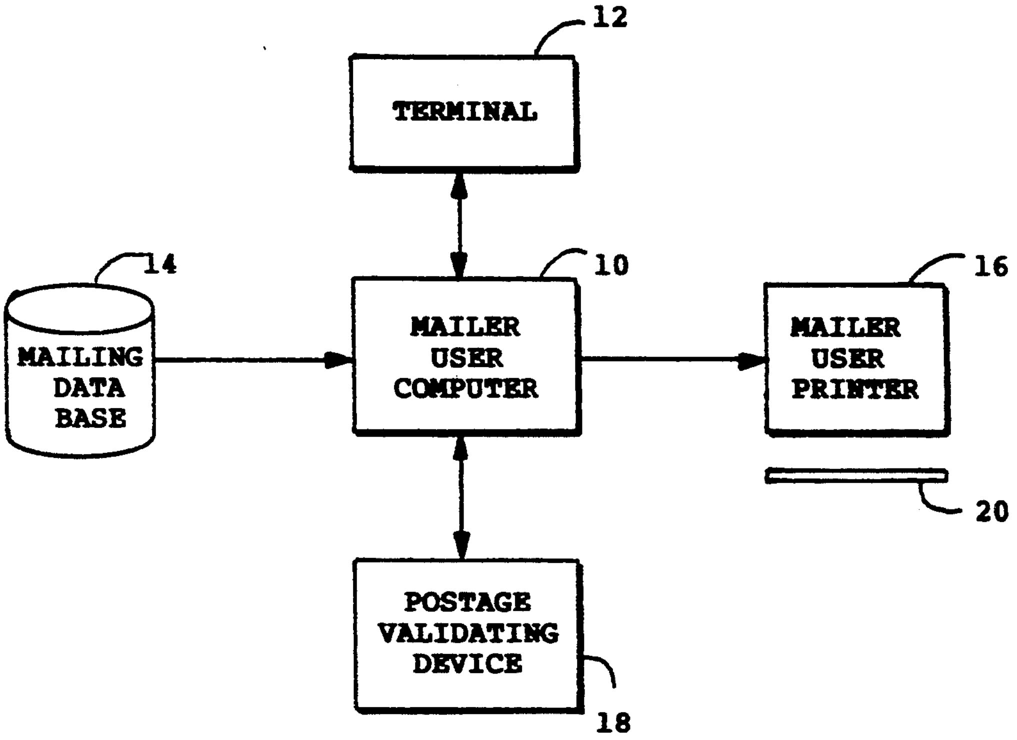
FIG. 1 is a block diagram of a mail processing system employing a postage validating device and suitable for use by a postage user to print postage.

Referring now to FIG. 1, the mail system shown is a system that does not contain both a secure postage printing section and a secure postage accounting section typically found in conventional meters. That is, in accordance with the present invention, no funds that represent the primary accounting for postage are stored within the device.

A mail user's computer 10 has information supplied to it by a data input terminal 12 and a data base of mailing information 14. The mail user's computer 10 is connected to the mail users' printer 16. Also connected to the computer 10 is a postage validating device 18. The postage validating device 18 includes an encryption algorithm which is utilized to process data from the mailing data base 14, and if desired from the terminal 12 to provide to the computer an encrypted text.

The postage validating device ensures authenticity of the mailpiece postage in the following manner. The user provides the postal validating device 18 with information about himself and about the addressee (e.g., for name, address, and zip code both the sender and the addressee). The postage validating device 18 adds its own information such as time, day secret number and other similar type of information. The postage validating device generates in accordance with the encryption algorithm, encrypted text which is sent to computer 10.

The printer receives print instructions from the computer 10 to print the necessary postage information along with validation information on the mailpiece 20. It will be appreciated that the fraudulent use of the system in accordance with the invention is not feasible for two main reasons. Firstly, the encryption algorithm stored within the postage validating device is secret and is extremely difficult to break. Systems such as private key and public key encryption techniques including DES and other various arrangements can be employed. Secondly, the printed information to validate the mailpiece is valid only for a particular sender, address, time, day, thereby limiting the use of the system for improper purposes. The use of a secret number known only to the post office and other appropriate officials adds yet further security. Thus, no one other than authorized users are able to use the text for their own purposes. Generation of some encrypted text on several pieces of mail by the user does not give any advantage to the user since the entire flow of such mail can be monitored by the post office. This monitoring capability makes fraud easily detectable.

It should be recognized that the system at the mail user's site does not include the storage of postage value representations to allow accounting at the site. Accounting occurs at a later point in the mail processing system, after the postage and validating information has been printed on the mailpiece 20. It should also be expressly recognized that the postage system of FIG. 1 can keep track of the mail and can additionally provide various levels of accounting as a user optional feature to provide various services to enable the user to monitor his mailing activity.

Figure 2:
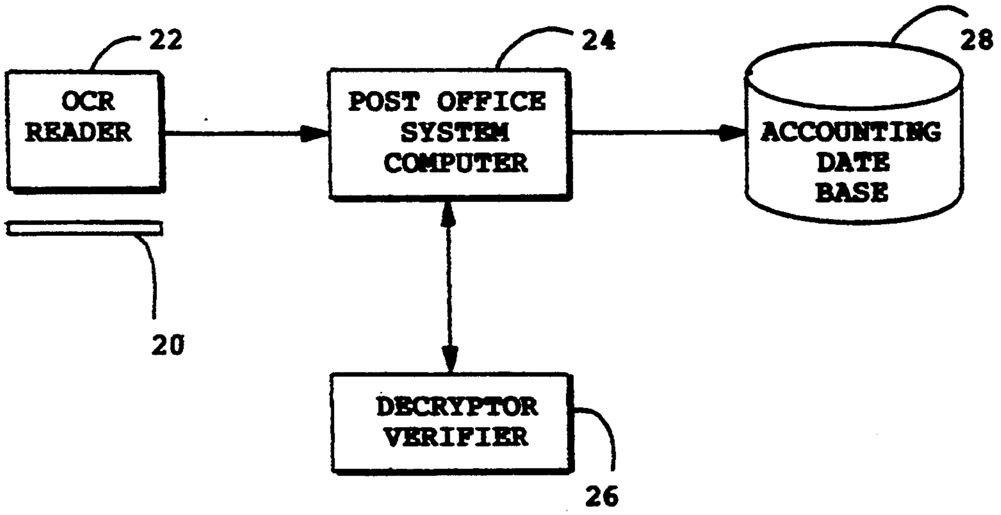
FIG. 2 is a block diagram of a mail system for accounting for postage printed by the system shown in FIG. 1.

FIG. 2 shows a system which may be employed at the post office or other locations to account for postage value printed by the mail user system shown in FIG. 1. An OCR reader 22 reads information printed on the mailpiece 20. The information from the optical character recognition reader 22 is applied to the post office system computer 24 which in turn is coupled to a decryptor verifier 26. The decrypter/verifier 26, in conjunction with the computer, decrypts the information printed on the mailpiece 20 by using the printed secret number and other information on the envelope to provide sufficient data to decrypt the information. The decrypted information is used to identify the account to which the postage value should be charged, the account is debited, and the information is thereafter stored by the computer 24 in an accounting data base 28. In this manner, at the time of processing by the post office, the user accounting occurs. The post office may generate statements at a later date to charge the user for the use of postage.

Figure 3:
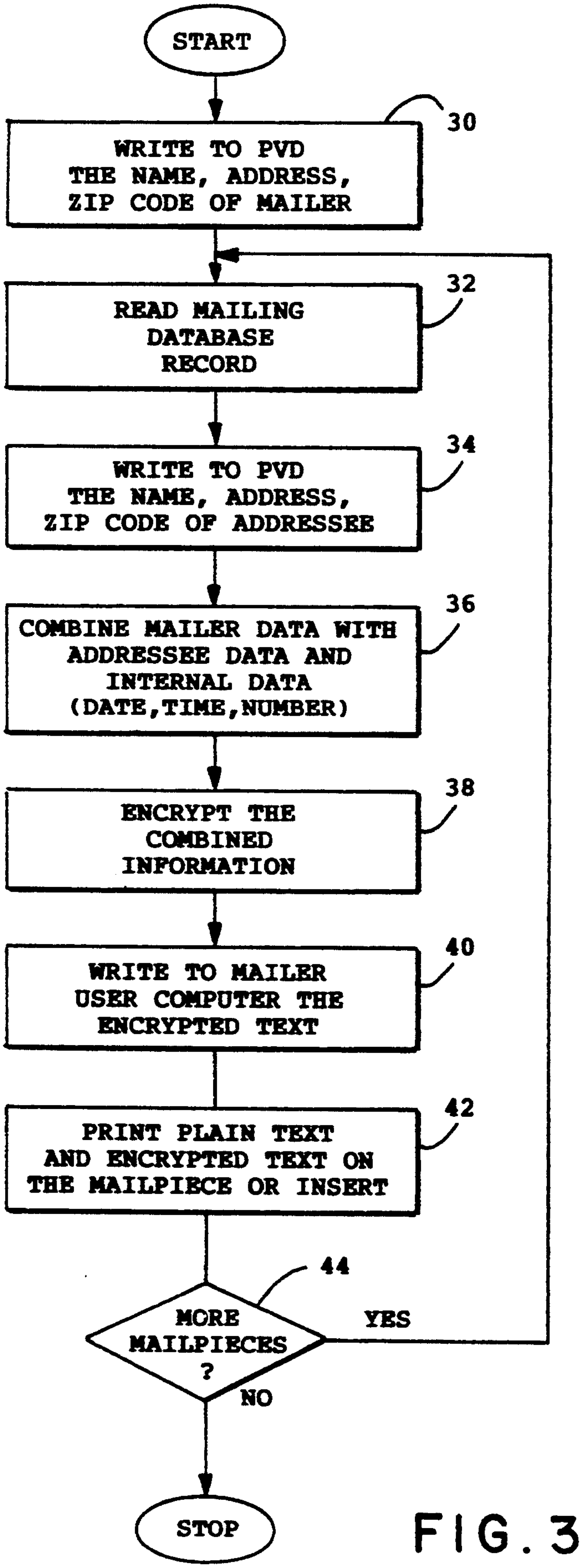
FIG. 3 is a flow chart of the operation of the system shown in FIG. 1.

Reference is now made to FIG. 3 which is a flow chart of the operation of the system shown in FIG. 1. The mailer's computer 10 operates by writing to the postage validating device 18, data such as for example, the name, address, zip code of the mailer or user, block 30. Thereafter the computer reads the mailing data from the data record 14, block 32. The computer writes to the postage validating device, the name, address, zip code of the addressee, block 34. The postage validating device 18 combines the mailer data with the addressee data and with other internal data such as date, time and secret number, block 36. The information is thereafter encrypted and combined, block 38. The postage validating device thereafter writes to the mailer's computer, the encrypted text, block 40. The mailer's computer causes the printer 16 to print plain text, i.e. addresses and postal value and the encrypted text on the envelope or tape or envelope insert (which appears through a window in the envelope), block 42. Thereafter if more mailpieces are in the system, the system loops around and continues the process but if there are no additional mailpieces, the system stops, decision block 44.

Figure 4:
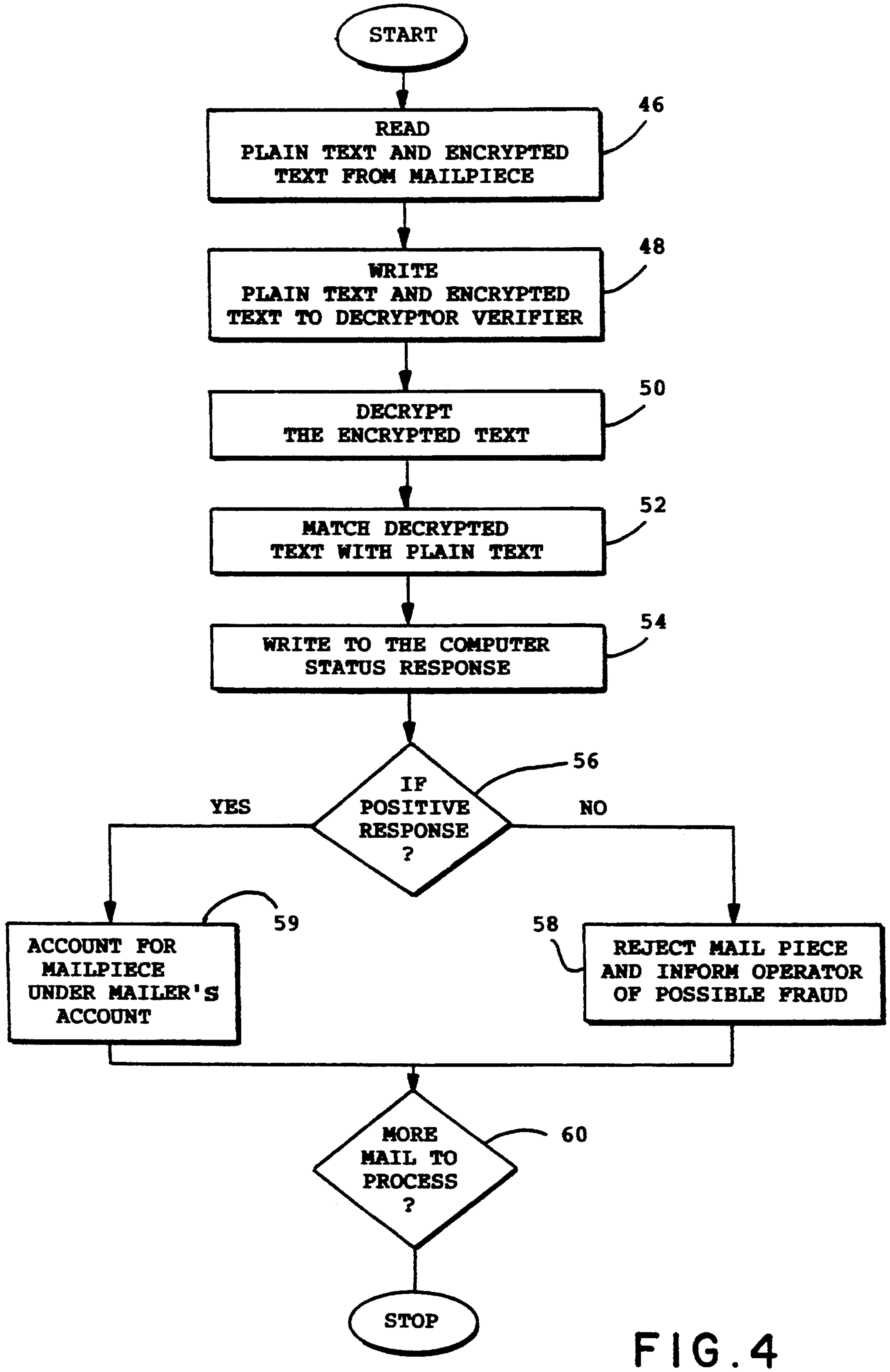
FIG. 4 is a flow chart of the operation of the system shown in FIG. 2.

Reference is now made to FIG. 4 which is a flow chart of the operation of the system shown in FIG. 2. The OCR reader 22 scans and reads the plain text and encrypted text from the envelope, label or insert in the envelope, block 46. The computer thereafter writes the plain text and the encrypted text to the decrypter/-verifier, block 48. The decrypter/verifier 26 decrypts the encrypted text, block 50. Thereafter, the decrypter/verifier matches the decrypted text with the plain text, block 52. The decrypter/verifier writes to the computer the status of the response, block 54. If an affirmative match has occurred at decision block 56, the post office computer accounts for the mailpiece under the mailer or user's account, block 58. If, on the other hand, the determination is negative, that is, no match has occurred in decision block 56, the post office computer rejects the mailpiece and informs the post office system operator or other appropriate official of possible fraud, block 58. The flow then continues to a decision block 60 where if more mail is to be processed, the system loops back, while if no further mail is to be processed, the system stops.

The above described embodiment can be modified in a variety of ways and those modifications would still be within the spirit and scope of the invention. For example, various forms of encryption can be employed, various forms of optical character reading can be employed and various levels of accounting and report generation can be provided at the user's facility. Thus, while this invention has been disclosed by means of a specific, illustrative embodiment, the principles thereof are capable of a wide range of modifications by those skilled in the art within the scope of the following claims.

What is claimed is:

1. A postage accounting system comprising:

a computer;

means for reading data on a mailpiece after delivery to a postal delivery system office;

means, coupled to said computer, for validating data read by said means for reading, said data including an account to be charged for such mail delivery charges; and an accounting data base coupled to said computer for storing the postage accounting information obtained from said mailpiece.

2. A method for creating a postage imprint comprising the steps of:

processing mail data information to encrypt the information, the information including a postage value amount and a user identification number;

printing both the encrypted information and clear text information on a mailpiece;

delivering the mailpiece to a postal delivery service;

scanning the mailpiece to read the encrypted information;

decrypting the encrypted information to determine the postage amount and the user account number; and charging the postage value amount to the user account.

3. A method for accounting for postage comprising reading a mailpiece having previously encrypted information thereon, said information including postage value and an account number, to obtain from the mailpiece both encrypted and clear text information, processing such clear text and encrypted information to determine the validity of the imprint, the postage value, and the mailer's account number, and charging the mailer's account with the amount of postage for subsequent billing to the mailer.

4. A postage system comprises:

a computer;

means, coupled to said computer, for providing postage validating information, said postage validating information including a user account number;

means, coupled to said computer, for printing said postage validating information on a mailpiece along with a postage value; and wherein said system has the capability to continue printing said postage validating information and said postal value for successive mailpieces without limitation as to the total value printed by said system.

5. System as claimed in claim 4 wherein said postage validating information providing means includes:

means for encrypting data.

6. System as claimed in claim 4 further comprises:

means, coupled to said computer, for storing a mailing information data base.

7. System as claimed in claim 6, wherein said postage validating information providing means includes:

means for encrypting data from said mailing information data base.

8. System as claimed in claim 6 further comprises:

means, coupled to said computer, for inputting data.

9. System as claimed in claim 4 further comprises:

means for reading said postage validating information;

another computer, said another computer being coupled to said reading means;

means, coupled to said another computer for validating said postage validating information; and means, coupled to said another computer, for storing an accounting data base such that said another computer can account for said postal value.

10. System as claimed in claim 9, wherein said validating means includes:

means for decrypting said postage validating information.

* * * * *